United States Patent [19]

Oguchi et al.

[11] Patent Number: 4,945,437
[45] Date of Patent: Jul. 31, 1990

[54] MAGNETIC HEAD MECHANISM FOR REVERSING HEAD ORIENTATION AND MOVING HEAD IN TAPE WIDTH DIRECTION

[75] Inventors: Yuzo Oguchi; Fumito Komatsu; Motohiro Iizawa, all of Nagano, Japan

[73] Assignee: Kabushiki Kaisha Sankyo Seiko Seisakusho, Nagano, Japan

[21] Appl. No.: 243,536

[22] Filed: Sep. 12, 1988

[30] Foreign Application Priority Data

| Sep. 11, 1987 | [JP] | Japan | 62-227940 |
| Sep. 30, 1987 | [JP] | Japan | 62-246928 |
| Sep. 30, 1987 | [JP] | Japan | 62-246929 |
| Sep. 30, 1987 | [JP] | Japan | 62-246930 |

[51] Int. Cl.$^5$ .................. G11B 5/55; G11B 21/08
[52] U.S. Cl. ........................... 360/106; 360/105
[58] Field of Search ......................... 360/106, 105

[56] References Cited

U.S. PATENT DOCUMENTS

| 4,389,689 | 6/1983 | Sims, Jr. | 360/109 |
| 4,392,163 | 7/1983 | Rijckaert et al. | 360/109 |
| 4,414,593 | 11/1983 | Miller et al. | 360/102 |
| 4,491,890 | 1/1985 | Rudi | 360/106 |
| 4,609,959 | 9/1986 | Rudi | 360/106 |
| 4,783,709 | 11/1988 | Koizumi et al. | 360/109 |

FOREIGN PATENT DOCUMENTS

58-32204  2/1983  Japan.
60-47225  3/1985  Japan.

*Primary Examiner*—Robert S. Tupper
*Attorney, Agent, or Firm*—Sughrue, Mion, Zinn, Macpeak & Seas

[57] ABSTRACT

A magnetic head mechanism in a magnetic tape apparatus is capable of multiple track, two-way recording and reproduction on magnetic tape. A magnetic head is supported in such a way that it is reversible around an axis that is perpendicular to the surface of the head over which magnetic tape slides, the magnetic tape is moved across the width of the magnetic tape.

11 Claims, 5 Drawing Sheets

MAGNETIC HEAD MECHANISM FOR REVERSING HEAD ORIENTATION AND MOVING HEAD IN TAPE WIDTH DIRECTION

BACKGROUND OF THE INVENTION

The present invention relates to a magnetic head mechanism in a magnetic tape apparatus that is capable of multiple track, two-way recording and playback.

Multiple track, two-way recording and playback is typically performed with a magnetic tape apparatus such as a backup tape recorder on a magnetic disk apparatus. With a view to performing multiple track recording with conventional magnetic tape apparatus, U.S. Pat. No. 4,389,689 proposes the use of multichannel magnetic heads fixedly connected with a mounting plate, and U.S. Pat. No. 4,491,890 proposes that the number of channels on a magnetic head be reduced by adapting it to be movable in the direction of tape width.

The first proposal has the disadvantage that a multichannel magnetic head is not only difficult to fabricate by machining but also expensive. The second approach which depends on moving a magnetic head in the direction of tape width suffers the problem that a magnetic head having at least two channels is required when recording by a serpentine recording technique or a read-after-write technique or performing recording over a large width and playback from a narrow width or vice versa (see U.S. Pat. No. 4,414,593), and this also results in difficulty of machining and high production cost.

In some audiotape recorders, the magnetic head is adapted to be reversible in orientation so as to achieve two-way recording and playback. However, none of the prior art audio tape recorders have a dual capability for reversing the magnetic head and moving it in the direction of tape width and the number of tracks on which information can be recorded and reproduced has been limited.

SUMMARY OF THE INVENTION

The present invention has been accomplished in order to solve these problems of the prior art. An object, therefore, of the present invention is to provide a magnetic head mechanism that is capable of not only performing multiple track, two-way recording and playback with a magnetic head as simple as a single-channel head but also realizing both track interchange and reversal of magnetic head in an efficient manner with a simple arrangement.

Another major requirement of the industry is to perform high-density recording on tape with the guard band between tracks being eliminated, and azimuth recording is one possible solution to this problem. To perform azimuth recording a multichannel magnetic head having different azimuth angles is necessary but such a head is difficult to fabricate. To effect azimuth recording, a head with at least two channels having different azimuth angles is necessary. As a further problem, in order to perform recording on multiple tracks, the magnetic head must be moved over the full width of tape and this necessitates a large space, leading to a bulky mechanism.

Therefore, another object of the present invention is to provide a magnetic head mechanism that enables azimuth recording with a magnetic head of simple configuration while avoiding the increase in the thickness of the mechanism.

The above-stated objects of the present invention can generally be attained by a magnetic head mechanism which comprises means for supporting a magnetic head reversibly around an axis that is perpendicular to the surface of the head over which magnetic tape slides, means for moving the support means across the width of the magnetic tape, means for reversing the magnetic head by engaging the rear portion of the magnetic head, and means for moving the reversing means or the magnetic head in a direction having a component perpendicular to the surface of magnetic tape. This magnetic head mechanism reverses the magnetic head by allowing the reversing means to move relative to the magnetic head in a direction having a component perpendicular to the surface of magnetic tape.

In the mechanism of the present invention, track interchange is effected with the moving means which allows both the support means and magnetic head to be moved across the width of magnetic tape. When the reversing means moves relative to the magnetic head in a direction having a component perpendicular to the surface of magnetic tape, the reversing means comes into engagement with the rear portion of the magnetic head, thereby allowing the magnetic head to be reversed on the support means.

DETAILED DESCRIPTION OF THE INVENTION

Several embodiments of the magnetic head apparatus of the present invention are described hereinafter with reference to the accompanying drawings.

Figure 1:
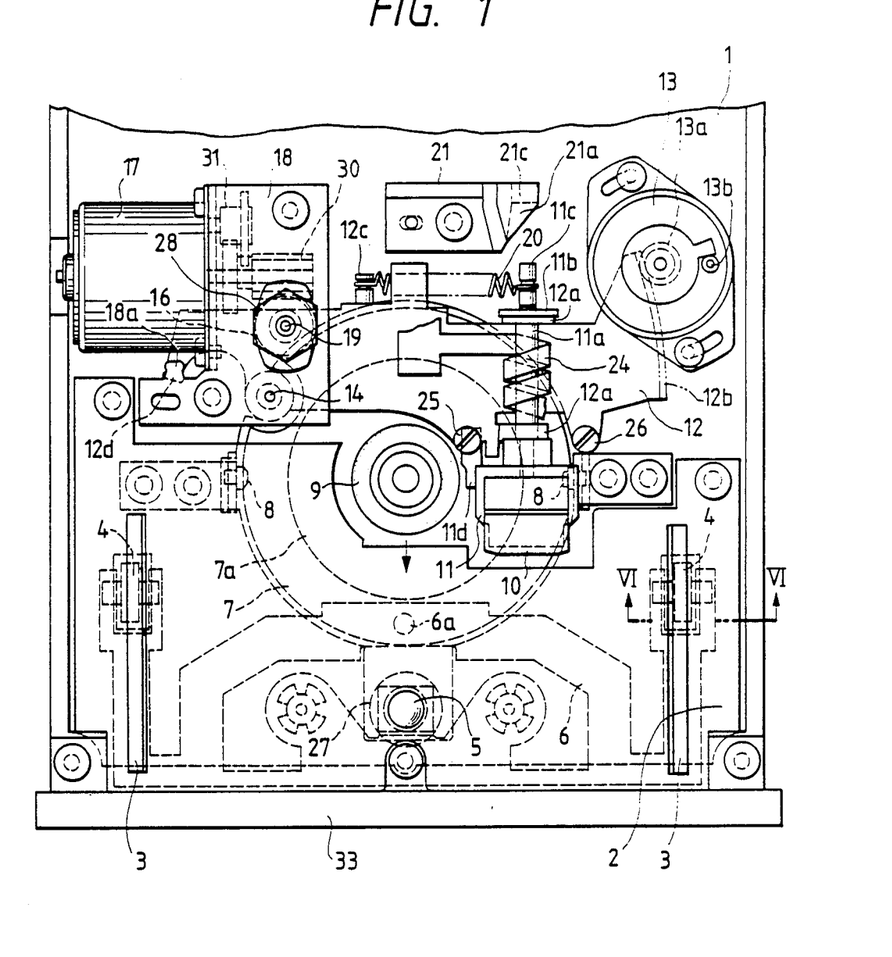
FIG. 1 is a front view of a magnetic head mechanism according to an embodiment of the present invention.
Figure 3:
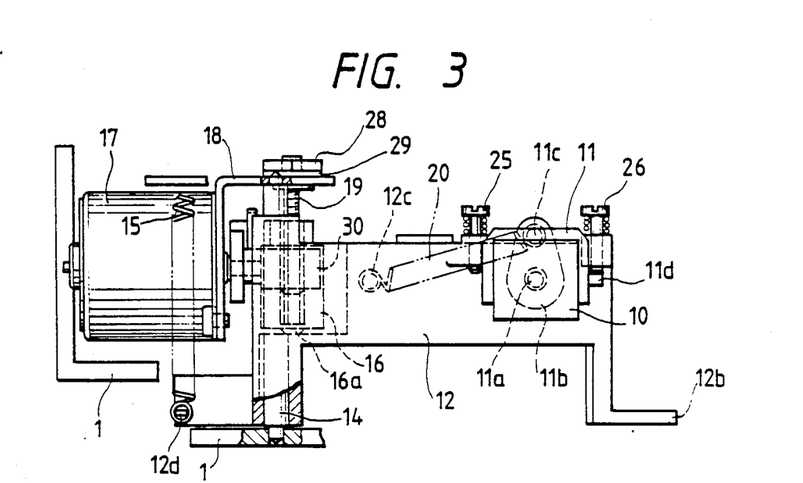
FIG. 3 is a front view showing the operational mode of the mechanism shown in FIG. 1.
Figure 6:
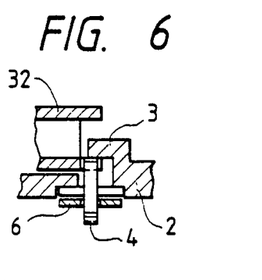
FIG. 6 is a cross section of FIG. 1 taken on line VI—VI.

In FIGS. 1 and 3, a chassis 1 typically made of aluminum by die casting is furnished with a subchassis 2 typically made of a resin which substantially covers the front half (the lower half of FIG. 1) of the chassis 1. As also shown in FIG. 6, the subchassis 2 is furnished with a pair of guides 3 that guide the loading of a tape cassette 32 and which provide a reference plane for the positioning of the loaded cassette 32 in a vertical direction. The guides 3 are formed integrally with the subchassis 2 and project in the direction of cassette loading.

The guides 3 are provided symmetrically in the right and left portions of the subchassis 2. A leaf spring 6 is attached to the underside of the subchassis 2. A roller 4 is disposed between the leaf spring 6 and the subchassis 2 and under each guide 3. A ball 5 in a ball holder 27 is also provided between the leaf spring 6 and the subchassis 2 and in a median portion between the two guides 3. The rollers 4 and the ball 5 are urged with the leaf spring 6 toward the top surface of the subchassis 2. The rollers 4 cooperate with the ball 5 to hold the loaded cassette in position.

A capstan motor 7 is disposed in the central portion of the chassis 1. The motor 7 has a rotor 7a that performs direct drive of a capstan 9 and is swingably supported on a pair of fulcrums 8. The motor 7 is positioned under the subchassis 2 and the leaf spring 6 and urged in one direction around the fulcrums 8 by means of a projection 6a on the leaf spring 6 in such a way that the capstan 9 is urged in the direction indicated by the arrow in FIG. 1 to be pressed against capstan rollers in the cassette 32.

A magnetic head support member 12 is mounted on the chassis 1 in such a way that it is capable of pivoting around a shaft 14 on the chassis 1 in a horizontal plane parallel to the surface of the chassis 1 while it is movable in a vertical direction along the shaft 14. The shaft 14 is positioned closer to the left end of the head support member 12. A pair of supports 12a positioned across the head support member 12 are formed integrally with the latter on a location that is closer to its right end. A reversing shaft 11a for a head holder 11 penetrates through the supports 12a. The head holder 11 is capable of rotating about the shaft 11a. A magnetic head 10 is fixedly attached to the front end of the head holder 11. The shaft 11a is provided vertically with respect to the surface of the magnetic head 10 over which tape slides, and the support member 12 supports the magnetic head 10 reversibly around the shaft 11a. The magnetic head 10 has an erase core, a recording core and a reproduce core. These cores may be arranged in a single set to provide a mono-channel configuration. The recording gap is longer than the reproduction gap in the direction of tape width or vice versa so that recording can be made over a large width and reproduction can be made over a small width, or vice versa.

Figure 4:
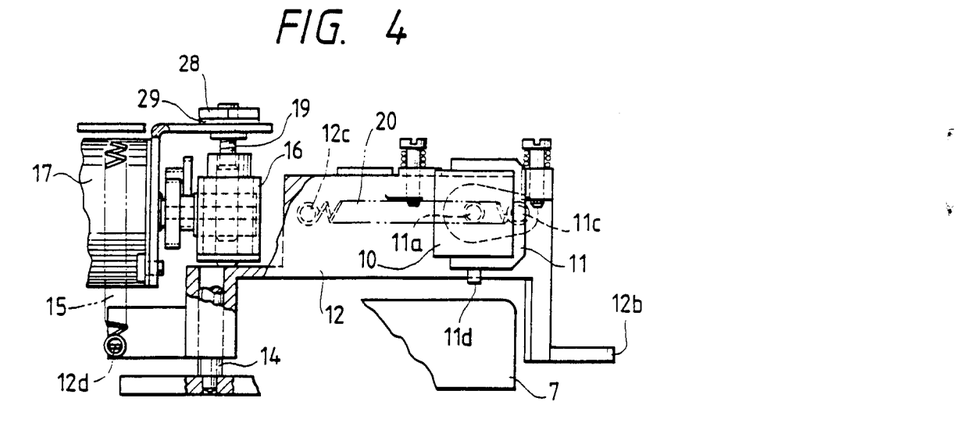
FIG. 4 is a front view showing the operational mode of the mechanism shown in FIG. 2.
Figure 5:
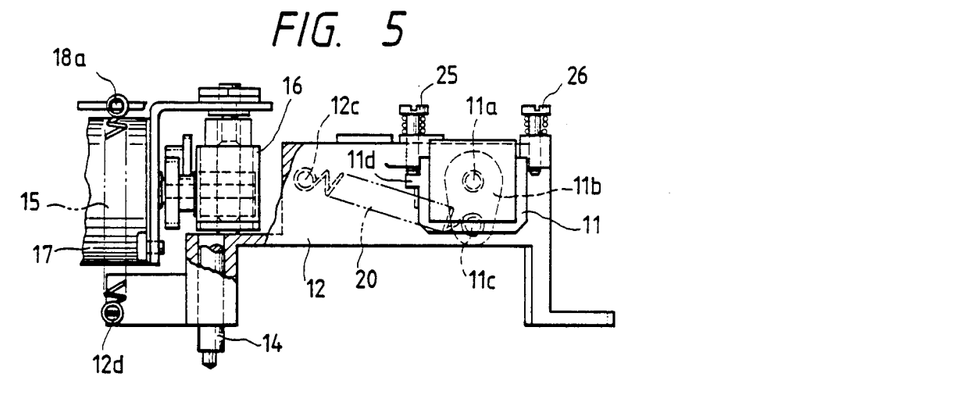
FIG. 5 is a front view showing a still another operational mode of the mechanism shown in FIG. 1.

A positioning projection 11d is provided on one lateral side of the head holder 11. The rear end of the reversing shaft 11a projects rearwardly from the rear part of support 12a and a leaf-shaped reversing plate 11b is secured to that rear end. A spring hook 11c is fixedly provided at the front end of the reversing plate 11b, and a reversing spring 20 is provided between this spring hook 11c and a reversing spring 20 is provided between this spring hook 11c and another spring hook 12c that is fixedly provided on the head support member 12. The spring hook 12c is disposed at a height generally equal to that of the reversing shaft 11a. As best illustrated in FIG. 4, the reversing spring 20 is at its dead point when the spring hook 11c is on a line that connects the spring hook 12c with the reversing shaft 11a. When both the spring hook 12c and the reversing shaft 11a come to a position lower than the spring hook 11c, the reversing spring 20 goes beyond its dead point and the reversing plate 11b rotates in a counterclockwise direction as shown in FIG. 3. If the spring hook 12c and the reversing shaft 11a come to a position higher than the spring hook 11c, the reversing spring 20 also goes beyond its dead point and the reversing plate 11b rotates in a clockwise direction as shown in FIG. 5. As the reversing plate 11b rotates in either direction, the magnetic head 10 is reversed correspondingly. A pair of positioning screws 25 and 26 for restricting the range over which the magnetic head 10 should be reversed are threaded into the head support member 12 at right and left positions across the head holder 11. The positioning projection 11d contacts the lower end of either positioning screw 25 and 26 depending upon the direction in which the head holder 11 is reversed, thereby determining the position of its reversal.

A sector gear wheel 12b is formed at the right end portion of the head support member 12. The gear 12b meshes with a pinion 13a on the output shaft of a stepping motor 13 so that the head support member 12 will pivot around the shaft 14 as the stepping motor 13 is driven to rotate. The stepping motor 13 is provided with a stopper 13b that restricts the range over which the pinion 13a should rotate.

A holder plate 18 is fixed on a chassis 31 in the upper left portion of FIG. 1. A track interchanging stepping motor 17 is fixed to the vertical lug of the holder plate 18, and a worm 30 is securely attached to the output shaft of the stepping motor 17 which generates through the vertical lug in a horizontal direction. A screw shaft 19 is fixed downwardly to the horizontal lug of the holder plate 18 on the lateral side the shaft 14. The female thread of a track interchanging gear 16 is in engagement with the screw shaft 19. The track interchanging gear 16 meshes with the worm 30. The head support member 12 is urged with a spring 15 (FIG. 2) to ascend along the shaft 14. The spring 15 is provided between a spring hook 12d at the left end of the member 12 and another spring hook 18a on the holder plate 18 that lies above it. The ascending movement of the head support member 12 by the biasing force of the spring 15 is restricted by the lower end of the track interchanging gear 16. The screw shaft 19 is rendered adjustable in its vertical position by means of a track adjusting nut 28 (FIG. 3) in combination with a retainer spring 29 (also see FIG. 3) interposed between the screw shaft 19 and the nut 28. The track interchanging gear 16 provides means for moving the head support member 12 across the width of magnetic tape.

Figure 7:
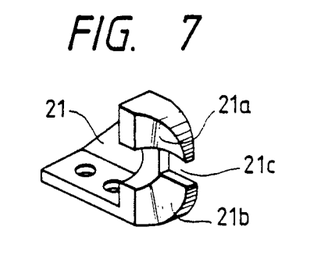
FIG. 7 is a perspective view of the head reversing cam used in the embodiment shown in FIG. 1.

A head rotating cam 21 is fixed on the chassis 31 at the back of the head holder 11. As best illustrated in FIG. 7, the cam 21 has an upper cam face 21a and a lower cam face 21b, as well as a control groove 21c formed horizontally between these cam faces. The cam faces 21a and 21b are capable of contacting the spring hook 11c integral with the head holder 11 depending upon the vertical position of the hook 11c. These cam faces have an inclined surface that guides the spring hook 11c into the central groove 21c when it is pressed against the cam 21. The cam 21 provides means for reversing the magnetic head 10 by engaging the spring hook 11c at the back of the head.

As shown in FIG. 1, a flexible printed circuit board 24 for transmitting signal between the magnetic head 10 and an external circuit is wound around the reversing shaft 11a. Symbol 33 denotes a front bezel.

The operation of the mechanism described above will proceed as follows. Suppose information is recorded or reproduced with the tape running in a forward direction in the operational mode shown in FIGS. 1 and 3. In this mode, both the track interchanging gear 16 and the head support member 12 are on their respective lower positions. The reversing spring 20 produces a force that causes both the reversing plate 11b and the magnetic head 10 to rotate around the reversing shaft 11a counterclockwise as shown in FIG. 3, whereupon the positioning projection 11d contacts the positioning screw 26 to determine the position of the magnetic head 10 in the direction of its rotation. The head support member 12 pivots around the shaft 14 in a clockwise direction (as viewed in FIG. 1), whereupon the magnetic head 10 advances toward the operator together with the head support member 12 in such a way that its front face makes slidable contact with magnetic tape running either rightward or leftward to perform information recording or reproduction.

Figure 2:
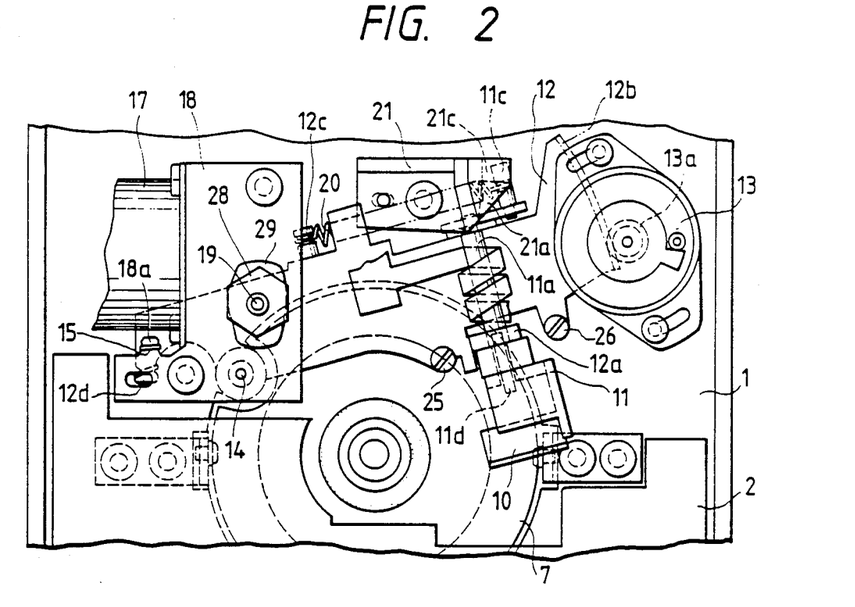
FIG. 2 is a plan view of the magnetic head mechanism shown in FIG. 1 but which operates in a different manner.

When a reverse signal is supplied from an appropriate control means, the track interchanging stepping motor 17 is driven to rotate and the head support member 12 is returned to a substantially central position in its vertical direction which corresponds to the direction of the width of magnetic tape. Stated more specifically, when the worm 30 is driven to rotate by means of the stepping motor 17, the track interchanging gear 16 is driven to rotate and ascends along the screw shaft 19, whereupon the head support member 12 ascends by the biasing force of the spring 15. When the head support member 12 comes to a substantially central portion in its vertical direction, the stepping motor 17 is brought to a stop. Subsequently, the head reversing stepping motor 13 is driven and the head support member 12 is allowed to pivot counterclockwise as shown in FIG. 2 by the mechanism consisting of the pinion 13a on the motor 13 and the sector gear wheel 12b. As the head support member 12 pivots, the head holder 11 moves backward and the spring hook 11c on the holder 11 contacts the upper cam face 21a of the head rotating cam 21. The spring hook 11c is depressed downward and obliquely by the cam face 21a, whereupon the reversing plate 11b as well as the head holder 11 and magnetic head 10 which are integral with the plate are displaced out of the state shown in FIG. 3 and rotate in a clockwise direction. In the meantime, the spring hook 11c is guided into the central 21c in the cam 21 and the head reversing motor 13 thereafter comes to a stop. In this instance, the magnetic head 10 is at a substantially median position of the range over which it can be reversed, and the reversing spring 20 comes to its dead point with the spring hook 12c, reversing shaft 11a and spring hook 11c all being aligned on a straight line.

In the next place, the stepping motor 17 is driven in such a way that the head support member 12 is moved upward. The spring hook 11c is restricted by the central groove 21c in the cam 21 with respect to its position in a vertical direction. When the head support member 12 moves upward, the spring hook 11c becomes lower in position than the line connecting the spring hook 12c and the shaft 11b, and the elastic force of the reversing spring 20 acts to rotate the reversing plate 11b in a clockwise direction (as viewed in FIG. 4). If, in this state, the head reversing motor 13 is driven so as to pivot the head support member 12 clockwise to the position indicated in FIG. 1, thereby advancing the head holder 11, the spring hook 11c comes out of engagement with the central groove 21c in the cam 21, and both the head holder 11 and the magnetic head 10 are rotated clockwise as shown in FIG. 5 by the elastic force of the reversing spring 20. Since the spring hook 11c comes out of engagement with the central groove 21c as it makes slidable contact with the lower cam face 21b of the cam 21, the head holder 11 and the magnetic head 10 will be reversed slowly enough to avoid any shock that might cause undesired effects such as azimuth error. The reversal of the magnetic head 10 is restricted by the positioning projection 11d on the head holder 11 which contacts the lower end of the positioning screw 25. When the head holder 11 advances toward the operator, the front face of the magnetic head 10 comes into slidable contact with the reverse running magnetic tape to perform information recording or reproduction.

By driving the stepping motor 17 to rotate during a record/reproduce mode in a forward or reverse direction, the head support member 12 and the magnetic head 10 supported by it can be controlled with respect to their vertical position so as to insure correct track interchanging.

In the embodiment of the present invention described on the foregoing pages, track interchanging is effected by moving the head support member 12 in the direction of tape width by means of the track interchange gear 16. At the same time, the magnetic head is reversed by moving it relative to the cam 21 in a direction having a component perpendicular to the surface of magnetic tape. Because of these features, a simple mechanism can be employed for performing not only reversal of the magnetic head 10 but also track interchanging. As an additional advantage, the magnetic head 10 is capable of performing multiple track, two-way recording and playback even if its composition is as simple as a monochannel configuration.

Another embodiment of the present invention is described hereinafter with reference to the case where azimuth recording is performed.

Figure 9:
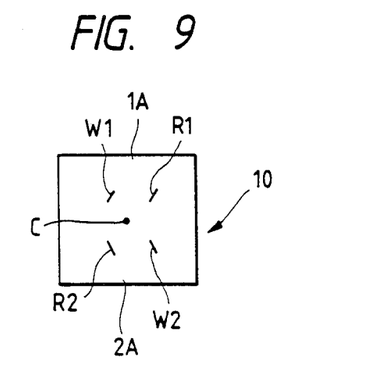
FIGS. 9 and 10 are front views showing two other embodiments of the magnetic head mechanism of the present invention.
Figure 10:
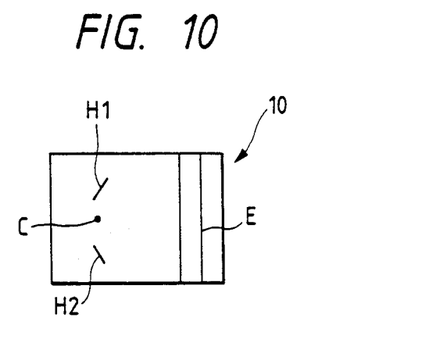

FIGS. 9 and 10 show a two-channel head block 10 that comprises the first head 1A and the second head 2A. Tape (not shown) is supposed to run from right to left or vice versa (as viewed in FIGS. 9 and 10) and the first and second heads 1A and 2A are disposed in the direction of tape width. The first head 1A has a recording (write) head W1 and a reproduce (read) head R1 that have a predetermined azimuth angle with respect to the recording tracks on tape and which are aligned in the direction of tape travel. The second head 2A has a recording (write) head W2 and a reproduce (read) head R2 that are also aligned in the direction of tape travel but which have a different azimuth angle than the first head 1A. The head block 10 enables information to be read after being written. In the first head 1A, write head W1 and read head R1 are oriented opposite to W2 and R2 in the second head 2A with respect to the direction of tape travel. The head block 10 is supported in such a way that it is movable in the direction of tape width. The head block 10 is also rotatable about a shaft that is perpendicular to the surface over which the magnetic tape slides and which is disposed at a position substantially median between the first and second heads 1A and 2A. The center of rotation provided by such a shaft is denoted by C in FIGS. 9 and 10.

Figure 11:
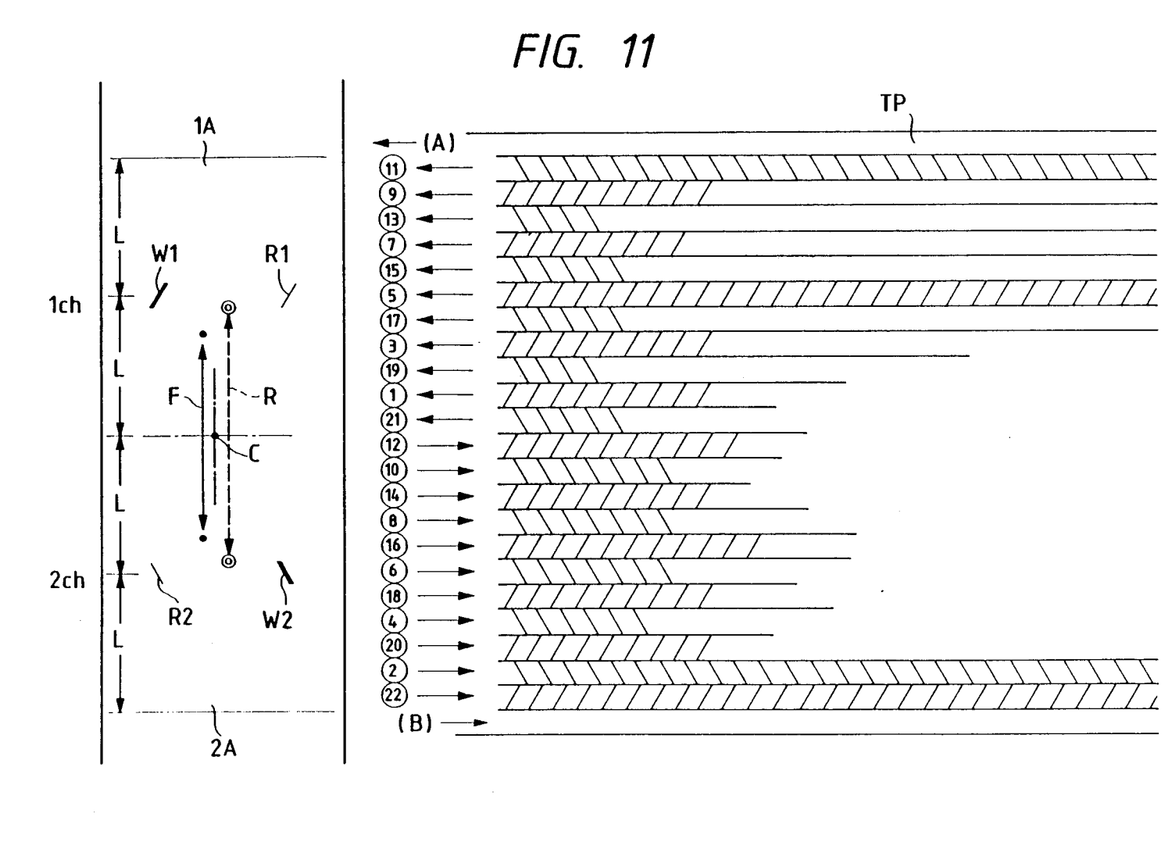
FIG. 11 is an illustration showing a track formed for azimuth recording.

FIG. 11 shows a track format for azimuth recording with the head block 10. Assume the magnetic tape runs in the forward direction indicated by arrow (A) and in the reverse direction indicated by arrow (B). Recording tracks are aligned on tape TP in the order of (11), (9), (13), (7), ... (1), (21), (12), (10), (14), (8), ... (20), (2) and (22) from top to bottom in the direction of tape width. Information is recorded and reproduced from track (1) with the first head 1A when tape is running in the forward direction. In a similar way, the first head 1A records and reproduces information from tracks (3), (5), (7) and (9) when the tape is running in the forward direction. Needless to say, information is recorded and reproduced from individual tracks as the head block 10 is moved in the direction of tape width. On the other hand, information is recorded and reproduced from track (2) with the second head 2A when the tape is running in the reverse direction. In a similar way, the second head 2A records and reproduces information from tracks (4), (6), (8) and (10) when the tape is running in the reverse direction. Again, information is recorded and reproduced from individual tracks as the head block 10 is moved across the tape.

In the next step, the head block 10 is reversed around the center of rotation C, and information is recorded and reproduced from tracks (11), (13) (15), (17), (19) and (21) with the second head 2A when the tape is running in the forward direction while the first head 1A records and reproduces information from tracks (12), (14), (16), (18), (20) and (22) when the tape is running in the reverse direction.

The above is the procedures for performing multiple track recording and playback in which information is recorded and reproduced from the upper half of the tracks on tape TP when the tape is running in the forward direction while the lower half of the tape is used for information recording and reproduction when the tape is running in the reverse direction. Information is recorded and reproduced from adjacent tracks at different azimuth angles since the head block 10 is reversed around the center of rotation for allowing the first and second heads 1A and 2A having different azimuth angles to perform alternate recording and reproduction. As a result, high-density recording can be accomplished without the problem of crosstalk even if tracks are closely arranged as shown in FIG. 11.

In FIG. 11, symbols F and R denote the ranges over which the head block 10 can move across the magnetic tape when it is running in the forward and reverse directions, respectively. In the embodiment shown, each of the first and second heads 1A and 2A is positioned a distance of L, or one fourth the total track width 4L, away from the center of rotation C, so the range of movement of each head in the direction of tape width can be minimized by adopting a system in which the direction of recording is altered whenever it covers one half the tape width as shown in FIG. 11. This contributes to a reduction in the overall height of the head mechanism.

As described above, the magnetic head mechanism of the present invention enables not only multiple track but also azimuth recording with a simple two-channel magnetic head. This magnetic head mechanism has the additional advantage of being reduced in height since the heads need to be moved over a shorter range in the direction of tape width. In addition, azimuth recording can be accomplished without experiencing off-tracking even if the track width is not varied in recording and playback modes.

In the embodiment shown in FIG. 9, each of the first and second heads is furnished with a recording and a playback head. This arrangement is not necessarily required and, as shown in FIG. 10, the head block 10 may be provided with a single first head H1 and a single second head H2 which are electrically interchangeable as a recording or a playback head. In this case, a full-width erase head E is formed integrally with the head block 10, and a shaft for reversing the first and second heads H1 and H2 is provided at a median position C between these heads. The head block 10 is supported in such a way that it is movable across the width of magnetic tape.

In the embodiment shown in FIG. 10, multiple track and azimuth recording can also be accomplished by electrically switching the individual heads H1 and H2 so that either one of them acts as a recording or playback head depending upon the direction of tape travel and on the mode of operation (whether it is in a recording or playback mode).

Figure 8:
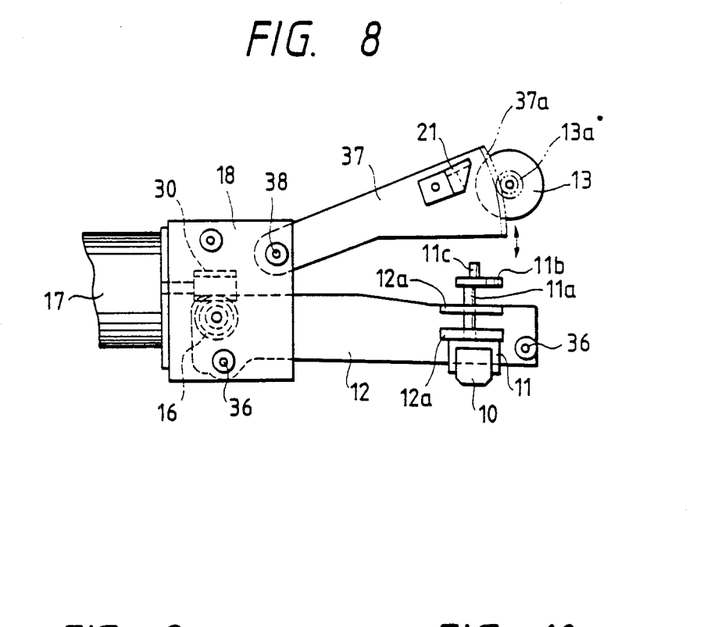
FIG. 8 is a plan view of a magnetic head mechanism according to another embodiment of the present invention.

The cam 21 as reversing means and the magnetic head 10 only need to be capable of relative movement in a direction having a component perpendicular to the surface of magnetic tape. An illustrative embodiment that satisfies this requirement is shown in FIG. 8, in which the cam 21 is mounted on a lever 37, which pivots to bring the cam 21 into engagement with the spring hook 11c in the rear of the magnetic head 10 so as to reverse it. The lever 37 is capable of pivoting around a shaft 38 when a sector gear wheel 37a at the front end of the lever meshes with the pinion 13a on the output shaft of the stepping motor 13. The head support member 12 is capable of moving only in a vertical direction along a guide shaft 36. Other components including the structure for supporting the magnetic head 10 and the mechanism for restricting the vertical position of the support member 12 are the same as those used in the embodiment shown with reference to FIGS. 1 to 7 and need not be described in detail.

According to one aspect of the present invention, track interchanging is accomplished by moving the head support member across the width of magnetic tape with specified moving means while at the same time, the magnetic head is reversed by moving it relative to specified reversing means in a direction having a component perpendicular to the surface of magnetic tape. Because of these features, a simple mechanism can be employed for performing not only reversal of the magnetic head but also track interchanging in an efficient manner. As an additional advantage, the magnetic head is capable of performing multiple track, two-way recording and playback even if its composition is as simple as a monochannel configuration.

In accordance with another aspect of the present invention, a head block comprising two heads having different azimuth angles is disposed in such a way that it is capable of moving across the tape width and being reversed about a median position between the two heads. This arrangement enables azimuth recording to be performed with a simple two-channel head. At the same time, it contributes to a reduction in the thickness or height of the magnetic head mechanism by virtue of the decrease in the range of head movement across the tape width.

We claim:

1. In a magnetic head mechanism in a magnetic tape apparatus capable of multiple track, two-way recording and reproduction on a magnetic tape having a plurality of parallel longitudinal tracks, the improvement comprising means for supporting a magnetic head in such a way that it is reversible by 180° in orientation around an axis that is perpendicular to the surface of the head over which the magnetic tape slides to allow two-way recording and reproduction on the magnetic tape, and means for moving said magnetic head across the width of said magnetic tape to effect track interchange.

2. In a magnetic head mechanism in a magnetic tape apparatus capable of multiple track, two-way recording and reproduction on a magnetic tape having a plurality of parallel longitudinal tracks, the improvement comprising means for supporting a magnetic head in such a way that it is reversible by 180° in orientation around an axis that is perpendicular to a surface of the head over which the magnetic tape slides to allow two-way recording and reproduction on the magnetic tape, first means for moving said magnetic head across the width of said magnetic tape to effect track interchange, reversing means for rotating said magnetic head in a reversing direction, and second means for moving said magnetic head or said reversing means in a direction having a component perpendicular to the surface of said magnetic tape, said reversing means and said magnetic head being relatively moved in a direction having a component perpendicular to the surface of said magnetic tape by said second moving means so as to reverse said magnetic head.

3. In a magnetic head mechanism in a magnetic tape apparatus capable of multiple track, two-way recording and reproduction on a magnetic tape having a plurality of parallel longitudinal tracks, the improvement comprising means that includes a rotating axis that is perpendicular to the surface of the head over which magnetic tape slides and which supports said magnetic head in a reversible way so said magnetic head is reversible by 180° in orientation to provide two-way recording and reproducing on the magnetic tape, means for moving said magnetic head across the width of said magnetic tape to effect track interchange, reversing means for rotating said magnetic head to a median position in the reversing range of 180°, and means for urging said magnetic head to rotate in a reversing direction, the direction in which said magnetic head is rotatably urged by said urging means being determined by moving said moving means across the width of said magnetic tape, and said magnetic head which has been rotated to a median position of the reversing range by said reversing means being rotated in a predetermined reversing direction by said urging means.

4. In a magnetic head mechanism in a magnetic tape apparatus capable of multiple track, two-way recording and reproduction on a magnetic tape having a plurality of parallel longitudinal tracks, the improvement comprising means that includes a rotating axis that is perpendicular to the surface of the head over which magnetic tape slides and which supports said magnetic head in a reversible way so that said magnetic head is reversible by 180° in orientation to provide two-way recording and reproducing on the magnetic tape, first means for moving said support means across the width of said magnetic tape to effect track interchange, means for restricting the 180° range over which said magnetic head is reversed, means for urging said magnetic head to rotate in a reversing direction, reversing means for rotating said magnetic head to a median position in said reversing range, and second means for moving said magnetic head or said reversing means in a direction having a component perpendicular to the surface of said magnetic tape, the direction in which said magnetic head is rotatably urged by said urging means being set by moving said first moving means across the width of said magnetic tape, said magnetic head being rotated to a median position of said reversing range by allowing said reversing means and said magnetic head to be relatively moved by said second moving means in a direction having a component perpendicular to the surface of said magnetic tape, and said magnetic head being reversed from the median position in the direction of urging determined by said first moving means, aid median position having been reached by rotation with said reversing means.

5. A magnetic head mechanism according to any one of claims 2 to 4 wherein said reversing means is a cam having a cam face that contacts said support means.

6. A magnetic head mechanism according to any one of claims 2 to 4 wherein said magnetic head support means has a contactor portion distant from said rotating axis on the opposite side to said magnetic head with respect to the surface of said magnetic tape, said contactor portion contacting a cam face so as to rotate said magnetic head to a median position of the reversing range.

7. A magnetic head mechanism according to any one of claims 1 to 4 wherein said magnetic head is a monochannel magnetic head comprising a recording gap portion and a reproduce gap portion which is narrower than said recording gap portion.

8. A magnetic head mechanism according to any one of claims 1 to 4 wherein said magnetic head is a monochannel magnetic head comprising a recording gap portion and a reproduce gap portion which is wider than said recording gap portion.

9. A magnetic head mechanism according to any one of claims 1 to 4 wherein said magnetic head is a two-channel magnetic head comprising first and second gaps arranged side by side in the direction of the width of said magnetic tape, said first gap having a predetermined azimuth angle and said second gap having a different azimuth angle from said first gap.

10. A magnetic head mechanism according to claim 9 wherein the center of rotation of said magnetic head is located at a position substantially median between said first and second gaps.

11. A magnetic head mechanism according to claim 2 or 4 wherein said second moving means is composed of means that is capable of rotating about an axis parallel to the direction of the width of said magnetic tape, and drive means for rotatably moving said support means with respect to the surface of said magnetic tape.

* * * * *